(12) United States Patent
Ayyannan et al.

(10) Patent No.: US 11,983,158 B1
(45) Date of Patent: May 14, 2024

(54) SYSTEMS AND METHODS FOR PROCESSING INFORMATION ASSOCIATED WITH A UNIFIED COMPUTATION ENGINE INVOLVING DYNAMIC MAPPING AND/OR OTHER FEATURES

(71) Applicant: PAYPAL, INC., San Jose, CA (US)

(72) Inventors: Manimuthu Ayyannan, Fremont, CA (US); Deepak Mohanakumar Chandramouli, Milpitas, CA (US); Karteek Reddy Chada, Dublin, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/973,923

(22) Filed: Oct. 26, 2022

(51) Int. Cl.
*G06F 16/22* (2019.01)
*G06F 16/21* (2019.01)

(52) U.S. Cl.
CPC ........ *G06F 16/2291* (2019.01); *G06F 16/211* (2019.01)

(58) Field of Classification Search
CPC .......................... G06F 16/2291; G06F 16/211
See application file for complete search history.

(56) References Cited

U.S. PATENT DOCUMENTS

2001/0039653 A1* 11/2001 Egashira ............... G06F 8/4442
717/160

* cited by examiner

*Primary Examiner* — Baoquoc N To
(74) *Attorney, Agent, or Firm* — Greenberg Traurig, LLP

(57) ABSTRACT

Systems and methods related to dynamically orchestrating execution of a protocol by generating one or more executors and one or more functions using a network controller based on the protocol are disclosed. In one example embodiment, there is provided a method of receiving a user-defined logic to allow the network controller to generate a dataset including a plurality of accumulators, abstract one or more executors and functions, and generate a set of protocols at the one or more functions to activate a respective application stage to fulfill the service request based on the logic in near real-time. Moreover, methods herein may include determining a telemetry and/or insight generation based, at least in part, on the dataset.

20 Claims, 10 Drawing Sheets

SYSTEMS AND METHODS FOR PROCESSING INFORMATION ASSOCIATED WITH A UNIFIED COMPUTATION ENGINE INVOLVING DYNAMIC MAPPING AND/OR OTHER FEATURES

BACKGROUND

Field

The present disclosure relates to systems and methods that improve and/or unify computer processing, such as processing information related to dynamically configuring and/or adding network services associated with closed loop systems.

Description of Related Technology

Online providers of electronic services, such as electronic content access, electronic transactions, and the like, may offer various services to transacting entities to optimize and achieve associated objectives, such as user targeting following incomplete transactions. In one illustrative application, for example, the user may initiate a transaction with the transacting entity but abandon the process prior to completion for a myriad of reasons. Here, electronic service providers may accordingly offer user targeting services using intent detection to identify the transacting entity's incomplete electronic transactions and provide additional services such as analytics, user retargeting, initiating potential user identification and reach-out campaigns, etc. In some instances, a notification alert or electronic communication can be sent to the user to notify them that their transaction is incomplete. Typically, systems and methods that provide user retargeting services integrate an array of loosely-coupled applications.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Intent detection systems of the prior art may include a network computing environment including a plurality of drivers and a plurality of executors configured at the server by the service provider. The drivers are configured to provide instructions to the executors to perform the request for services from a respective user. Consequently, in systems of the prior art, each respective user may be in communication with a respective driver of the network computing environment. Further, each respective driver may be in communication with one or more executors configured by the service provider to access the respective application stages of an intent detection engine.

Tailoring electronic services to the unique objectives of each transacting entity is time-consuming because it requires extensive initial development to configure the applications according to each user's business goals. Further, these systems produce considerable technical debt as the system and/or a transacting entity's requirements evolve. The cost of ownership also increases as new capabilities are implemented into the preexisting architecture. Current solutions do not provide the flexibility and/or other capabilities (isolation, etc.) to meet new demands or to accommodate new services while ensuring low cost of ownership. Further, such existing applications are generally not capable or optimized to flexibly handle individual requests for micro-services.

As such, as set forth below, one or more example aspects of the present disclosure may overcome such drawbacks, increase speed and/or performance, and/or otherwise impart innovations consistent with the disclosed technology via the provision of systems or methods that may, inter alia, abstract a network layer to one or more pluggable application stages, utilize a special purpose network controller to orchestrate workflow, and/or implement one or more worker nodes and one or more user defined functions (UDFs) in near-real time.

Figure 1:
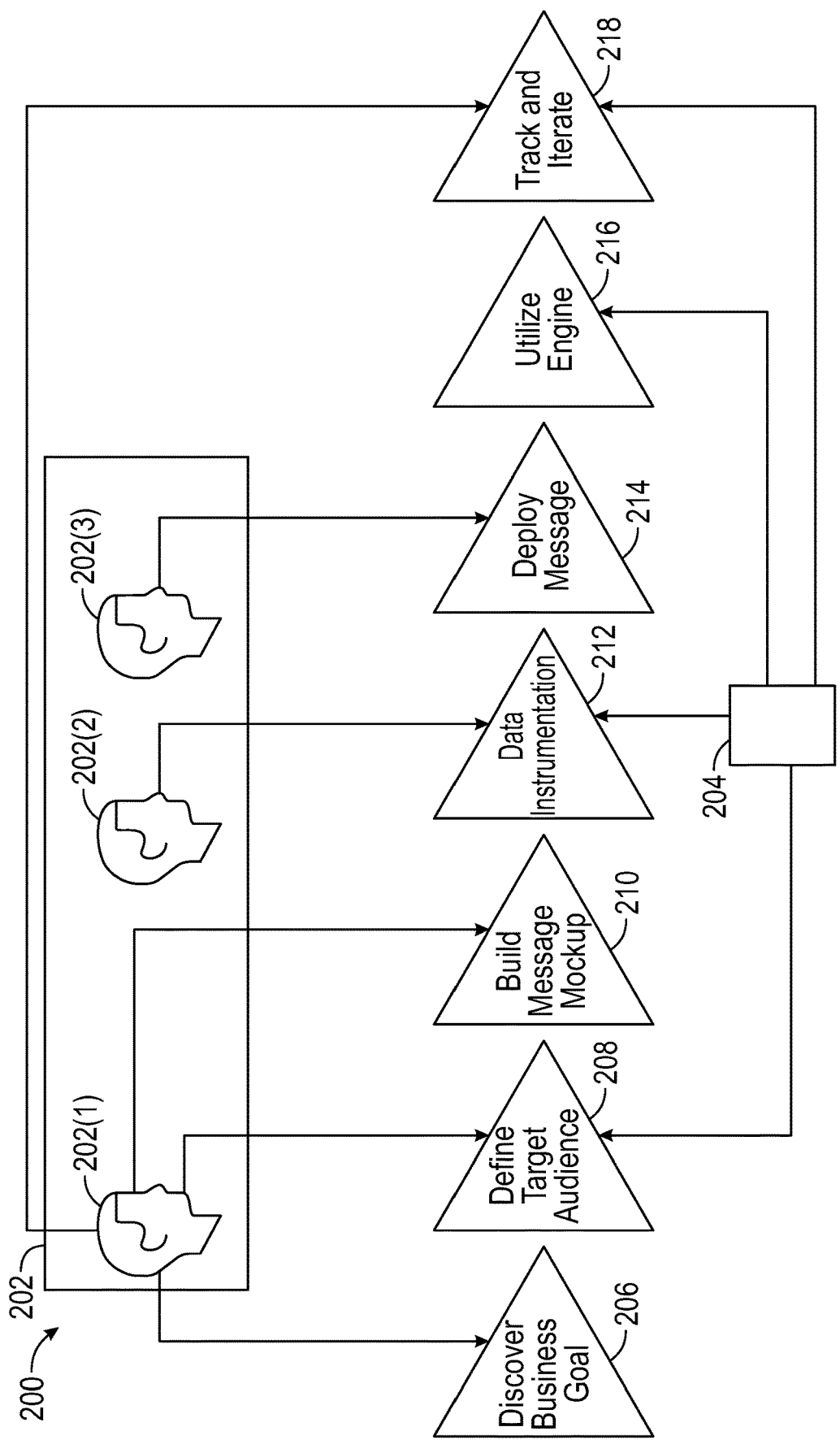
FIG. 1 is a flow diagram depicting an example implementation of a campaign objective shown in connection with associated logic stages, consistent with example aspects of certain embodiments of the disclosed technology.

FIG. 1 is a flow diagram depicting an example implementation of a campaign objective 200 shown in connection with associated logic stages, consistent with example aspects of certain embodiments of the disclosed technology. Such campaign objective may an intended output or outcome associated with at least one logic stage or engine implemented, at least in part, based on an enterprise strategy associated with a business, user, or other entity, such as successfully retargeting customers who have dropped from online transactions, e.g., in FIG. 6. The campaign objective 200 may be based on the goals of the user 202. In some embodiments, the user 202 may be a transacting entity, such as a merchant. In some embodiments, the user 202 may include one or more persons that coordinate the campaign objective 200 of the user 202. In some embodiments, the user 202 may include a campaign owner 202(1), a product team member 202(2), and an operations member 202(3). In some embodiments, each member associated with the user 202 may be responsible for one or more functions of the campaign objective 200. Furthermore, in some embodiments, the campaign objectives may define which external users (e.g., customers) the user 202 wants to target based on user behavior data and the campaign strategy to achieve the user's goals. In some embodiments, the user 202 may implement the strategy with the service provider 204 through data implementation. For example, a developer associated with the user 202 may define the logic of the user 202 and provide the logic to the service provider 204. In some embodiments, an agent of the service provider 204 may receive the logic of the user 202 and configure the network system based on the logic. For example, a global data scientist associated with the service provider 204 may receive the logic from the user 202 and configure the applicable network applications based on the logic defined by the user 202.

In some embodiments, the one or more functions of the campaign objective 200 may include discovering goals 206 of the user 202. In some embodiments, the campaign owner 202(1) may define the discovering goals 206. In some embodiments, the one or more functions of the campaign objective 200 may include defining a target audience 208. In some embodiments, the campaign owner 202(1) may define the target audience 208. In some embodiments, the target audience 208 may be external users that initiated a transaction with the user 202 but did not complete the transaction. In some embodiments, the target audience 208 may be based on any of a plurality of factors associated with the campaign objective 200 of the user 202. In some embodiments, the service provider 204 may receive data associated with the target audience 208 from the user 202 and may tailor and/or implement a networked system 300 based, in part, on the target audience 208 defined by the user 202.

In some embodiments, the one or more functions of the campaign objective 200 may include building a message mockup 210. The message mockup 210 may include data corresponding to the messaging provided to the external users. In some embodiments, the messaging may then be provided to the external users by a networked system, such as networked system 300 described in more detail below in connection with FIG. 2, based on a criterion defined by the user 202 based on the logic. In some embodiments, the campaign owner 202(1) may build the message mockup 210.

In some embodiments, the one or more functions of the campaign objective 200 may include data instrumentation 212. Such data instrumentation 212 may include the definitions of the user behavior data for use by an intent detection server, such as the intent detection engine 222 of FIG. 4, the application stage 224 and services provided by the intent detection engine 222, and a desired result based on the defined data and the application stage 224. In some embodiments, the user 202 may define the data instrumentation 212. In some embodiments, the campaign owner 202(1) may determine the data instrumentation 212. In some embodiments, the product team member 202(2) may determine the data instrumentation 212. In some embodiments, the service provider 204 may participate in determining the data instrumentation 212 utilized for deployment. In some embodiments, the service provider 204 may receive the data instrumentation 212 from the user 202 and may tailor and/or implement the networked system 300 based, in part, on the target audience 208 defined by the user 202.

In some embodiments, the one or more functions of the campaign objective 200 may include deploying messages 214. In some embodiments, the user 202 may define a trigger for deploy messages to external users. In some embodiments, the operations member 202(3) may define when and/or how to deploy messages. In some embodiments, the networked system 300 may be configured to deploy messages based on a result dataset generated by the intent detection engine 222 as will be further discussed herein.

In some embodiments, the one or more functions of the campaign objective 200 may utilize a computational engine, at 216, such as intent detection engine 222 shown and described in connection with the networked system 300 of FIG. 2. In some embodiments, the service provider 204 may further configure the networked system 300 and/or the intent detection engine 222 based on the one or more functions of the campaign objective 200 provided by the user 202. Furthermore, in some embodiments, the one or more functions of the campaign objective 200 may include, at 218, tracking and iterating an output of the engine 216, such as the output of intent detection engine 222 and/or the networked system 300. In some embodiments, such tracking and iterating 218 may include logging data corresponding to performance indicators of the result dataset. In some embodiments, the tracking and iterating 218 may include tracking deployed messages for a response from the external user. In some embodiments, tracking and iterating 218 may include applying the campaign objective 200 to new data (e.g., data that has not been analyzed by the intent detection engine 222 or data that the intent detection engine 222 previously did not determine an intent of the external user, etc.).

In some embodiments, the user 202 may designate a frequency for activating the intent detection and targeting services associated with the campaign objective 200. For example, the logic of the user 202 may include instructions for the networked system 300 to run the intent detection and targeting services in batches on the first of every month or more frequently in micro-batches, as will be further discussed below. In some embodiments, when the intent detection and targeting services are activated, the networked system 300 may perform operations for determining the intent of external users by applying the application stages 224 of the intent detection engine 222 based on the defined logic of the user 202. In some embodiments, using the intent detection engine 222 may include activating one or more pluggable application stages 224, as will be further described below. Moreover, in some embodiments, the service provider 204 may provide various tracking and reporting services associated with the service provider services to the user 202.

Figure 2:
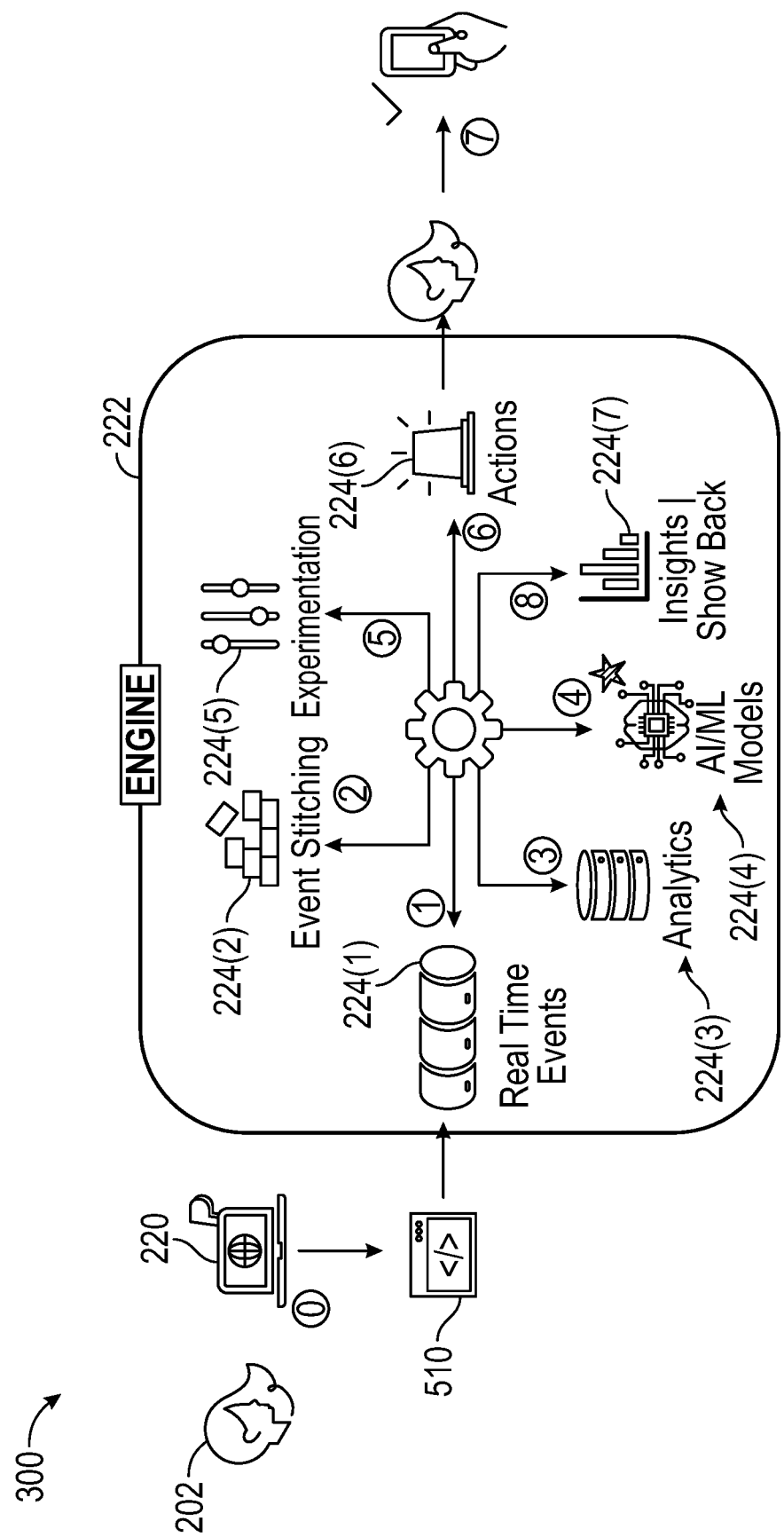
FIG. 2 is a diagram depicting an example operation of a networked system including an illustrative intent detection engine, consistent with example aspects of certain embodiments of the disclosed technology.

FIG. 2 is a diagram depicting an example operation of a networked system 300 including an illustrative intent detection engine 222, consistent with example aspects of certain embodiments of the disclosed technology. Referring to FIG. 2, a user 202 may transmit a request for services to a distributed computing environment 510 associated with the service provider 204. In some embodiments, the user 202 may transmit a protocol defining the request for services to the distributed computing environment 510. In some embodiments, a computing device associated with the user 202 may be communicably connected to the distributed computing environment 510 and the user 202 may provide one or more inputs at the computing device based on the logic of the user 202. Further, in some embodiments, the computing device may transmit the protocol to the distributed computing environment 510 to configure the distributed computing environment 510 based on the request for services. In some embodiments, the computing device may include an application interface 220. The application interface 220 is configured to receive inputs associated with logic of the user 202. Further, the application interface 220 may be configured to transmit the protocol to the distributed computing environment 510. In some embodiments, the application interface 220 may include one or more pluggable modules that receive the inputs defining the logic of the user 202 and that enable the application interface 220 to create the protocol as will be further discussed below.

The distributed computing environment 510 receives the protocol from the user 202 and/or a computing device associated with the user 202. In some embodiments, the distributed computing environment 510 may further be configured to transmit a set of second protocols to the intent detection engine 222 based on the protocol from the user 202. In some embodiments, the set of second protocols sent to the intent detection engine 222 may activate an application stage 224 of the intent detection engine 222. In some embodiments, the set of second protocols may activate one or more application stages 224, i.e., application stages 224(1) through 224(n), of the intent detection engine 222. In some embodiments, the set of second protocols to the intent detection engine 222 may activate a plurality of application stages 224 of the intent detection engine 222.

In some embodiments, the intent detection engine 222 may include one or more application stages 224, i.e., application stages 224(1) through 224(n). In some embodiments, each of the one or more application stages 224 may be pluggable application stages associated with targeting external users based on user behavior data. In some embodiments, the distributed computing environment 510 may be configured to activate a respective application stage 224 through the set of second protocols based on a network configuration requirement defined by the logic of the user 202 in the protocol. In some embodiments, the respective application stage 224 of the intent detection engine 222 may be added or removed from the request for services to the intent detection engine 222 based on the network configuration requirement. For example, the user 202 may activate the experimentation stage 222(5) of the intent detection engine 222 to test a new campaign strategy before implementing it into a live production environment.

In some embodiments, the distributed computing environment 510 may be configured to dynamically orchestrate workflow to the respective application stages 224 based on the protocol from the user 202. In some embodiments, the distributed computing environment 510 may dynamically orchestrate workflow by mapping a network configuration of the distributed computing environment 510 in near real-time to transmit the set of second protocols to the intent detection engine 222 and/or provide an output. Near real-time refers to the time delay between the time the protocol is received by the distributed computing environment 510 and the time the distributed computing environment 510 produces an output result based on the protocol. In some embodiments, the time delay may include whether orchestrating the workflow of the distributed computing environment 510 includes extensive configuration by a network administrator associated with the service provider 204.

In some embodiments, the application stages 224 of the intent detection engine 222 may include, but are not limited to, an event stage 224(1), an event stitching stage 224(2), an analytics stage 224(3), an artificial intelligence (AI)/machine learning (ML) model stage 224(4), an experimentation stage 224(5), an action stage 224(6), an insights stage 224(7), and/or other stages 224(n) (see FIG. 4), or combinations thereof. In some embodiments, the intent detection engine 222 may include an event stage 224(1). In some embodiments, activating the event stage 224(1) may include receiving a dataset including data corresponding to a plurality of accumulators. In some embodiments, the dataset may be received from the distributed computing environment. In other embodiments, the dataset may be further received from other components associated with the distributed computing environment 510 of FIG. 4, as will be further discussed below. In some embodiments, the dataset may include data corresponding to user behavior data. In some embodiments, the dataset may further include complete and/or incomplete transactions associated with the user. In some embodiments, the dataset may further include, but is not limited to, event data, checkpoint data, other data, or combinations thereof associated with transactions of the user 202. Those skilled person in the art will appreciate that the dataset may further include other data corresponding to other measurable metrics based on the interaction between the user 202 and the external user for one or more time periods and for one or more transactions in accordance with various embodiments of the present disclosure.

In some embodiments, the intent detection engine 222 may include an event-stitching stage 224(2). In some embodiments, activating the event-stitching stage 224(2) may include receiving the dataset from the distributed computing environment 510. In some embodiments, the dataset may include a plurality of accumulators corresponding to instances of user behavior data. In some embodiments, the dataset may include data corresponding to user behavior data over a period of time. In some embodiments, the period of time may be defined by the user 202. In some embodiments, the period of time may be one or more periods of time defined by the user 202, the service provider 204, or combinations thereof. In some embodiments, the dataset may be for one or more periods of time for a given external user associated with the user 202. For example, if a given external user visited an online storefront of the user 202 multiple times and added items to the external user's online shopping cart each visit but did not complete the transaction, the event-stitching stage 224(2) can join these events together to enable the intent detection engine 222 to analyze collective information associated with the joined events when determining the intent of the external user.

In some embodiments, the intent detection engine 222 may include an analytics stage 224(3). In some embodiments, the analytics stage may include identifying any of a plurality of performance indicators in initiated transactions between the user and one or more customers. In some embodiments, the performance indicators may include any of a plurality of qualitative or quantitative values between the user and the customer including, but not limited to, type of interaction, number of interactions, frequency of interactions, duration of the event, reaching interaction checkpoints, external user data, other similar data, or any combinations thereof. In some embodiments, the performance indicators may include data corresponding to the plurality of accumulators. In some embodiments, the performance indicators identified by the analytics stage 224(3) may be based on the logic of the user. In some embodiments, the analytics stage 224(3) may identify the performance indicators for one or more interactions between the user and the user's customers. In some embodiments, the performance indicators may be stored in a data storage of the service provider. Further, in some embodiments, each the other application stages 224 of the intent detection engine 222 may be electrically communicable with the analytics stage 224(3) to receive the performance indicators based on an activation and execution of the other application stage 224. In some embodiments, activating the analytics stage 224(2) may further include determining an intent of the external user based on the event data, event-stitching data, an application of an artificial intelligence (AI)/machine learning (ML) model to the event data and/or event-stitching data, and combinations thereof. For example, the analytics stage 224(3) may receive a series of joined events from the event-stitching stage 224(2) and identify one or more performance indicators in the series of joined events indicative of an intent by the customer to complete the transaction.

In some embodiments, the intent detection engine 222 may include the AI/ML model stage 224(4). In some embodiments, activating the AI/ML model stage 224(4) may include applying the AI/ML model stage 224(4) to the dataset from the distributed computing environment 510 to predict an intent of the external user based on the dataset. According to embodiments herein, the intent detection engine 222 may obtain the dataset from the distributed computing environment 510. In some embodiments, the dataset may include data corresponding to completed transactions and incomplete transactions of the service provider. In some embodiments, the base data may include data corresponding to completed transactions resulting from external user targeting of incomplete transactions by the intent detection engine 222 and/or incomplete transactions from external user targeting by the intent detection engine 222. Consequently, according to embodiments herein, the AI/ML model stage may receive data corresponding to the performance indicators from the analytics stage 224(4) and predicting an intent of the external user based on a comparison between the dataset and the data from the analytics stage 224(4).

In some embodiments, the intent detection engine 222 may include an experimentation stage 224(5). In some embodiments, activating the experimentation stage 224(5) may include evaluating changes to the logic of the user 202 in an experimental system environment using AB testing prior to implementing the changes into the live production environment. Other forms of testing may also be utilized. In some embodiments, the experimentation stage 224(5) may be further configured to run discrete tests in the live production environment using a limited dataset based on a change to the logic prior to implementing the change in the live production environment. For example, the user 202 may activate the experimentation stage 224(5) to run an experimental system environment redefining the logic by adding one or more performance indicators at the analytics stage 224(3) to broaden or refine the number of potential incomplete transactions of external users to target.

In some embodiments, the intent detection engine 222 may include an action stage 224(6). In some embodiments, activating the action stage 224(6) may include taking an action with the external user based on the intent prediction by the intent detection engine 222. In some embodiments, the intent detection engine 222 may transmit the action to the distributed computing environment 510 and the distributed computing environment 510 may take the action. For example, in some embodiments, the distributed computing environment 510 and/or the intent detection engine 222 may transmit a communication provided in the message mockup 210 to the external user including a notification to the external user generated in connection with one or more items that were left in a shopping cart. In another example, in some embodiments, the distributed computing environment 510 and/or the intent detection engine 222 may transmit a discount code to the external user that reduces the total price of their transaction, thereby providing an incentive to the external user to complete the transaction. Furthermore, consistent with various embodiments herein, the intent detection engine 222 and/or the distributed computing environment 510 may be configured to take any of a plurality of other actions to target the external user to complete the transaction.

In some embodiments, the intent detection engine 222 may determine a telemetry and/or an insight generation based on the user behavior data and the result dataset. In some embodiments, the intent detection engine 222 may determine the telemetry and/or the insight generation based on the plurality of accumulators of the dataset. In some embodiments, the intent detection engine 222 may determine the telemetry and/or the insight generation based on the result dataset. In some embodiments, the intent detection engine 222 may transmit the telemetry and/or the insight generation to the distributed computing environment 510, e.g., to be stored in a data store 242 associated with the distributed computing environment 510. For example, in some embodiments, the data corresponding to the telemetry and/or insight generation may be added to the metadata stored in the data store 242 of the distributed computing environment 510. Further, according to some implementations, the distributed computing environment 510 may include any of a plurality of other components and/or modules that may communicate with other devices and/or servers and may fulfill a request for service based on the protocol received from the application interface 220 and/or computing device associated with the user 202.

In some embodiments, the intent detection engine 222 forms the result dataset based on the activation of the respective application stages 224 and the respective application stages 224 executing its respective process based on the dataset and/or the results of the other one or more application stages 224. In some embodiments, the result dataset may be based on an execution of the one or more application stages 224. Furthermore, in some embodiments, the result dataset may be based on the dataset.

Figure 3:
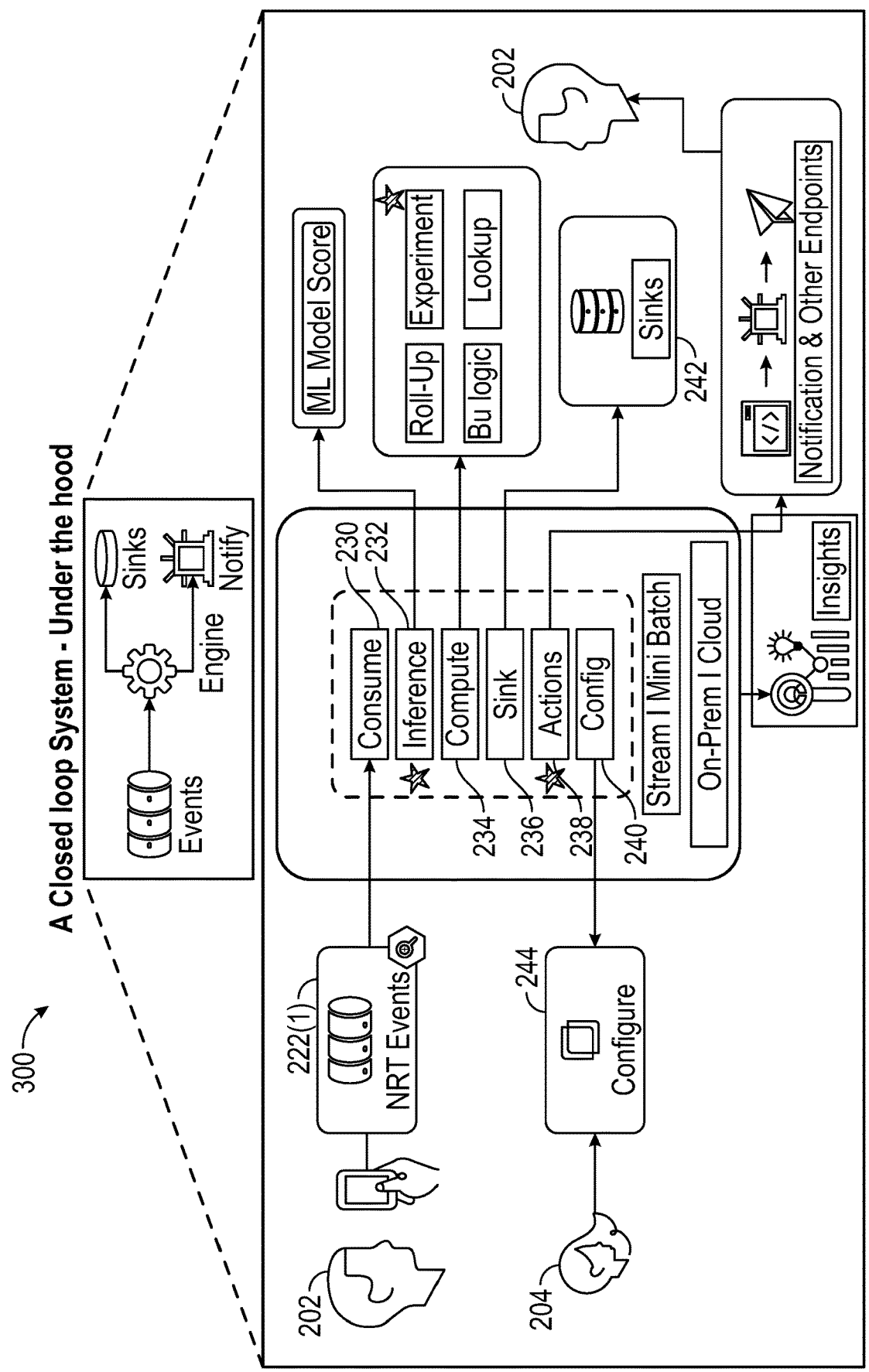
FIG. 3 is a diagram depicting aspects and exemplary operation of a networked system including an illustrative intent detection engine, consistent with example aspects of certain embodiments of the disclosed technology.

FIG. 3 is a diagram depicting aspects and exemplary operation of the networked system 300, including the illustrative intent detection engine 222, consistent with example aspects of certain embodiments of the disclosed technology. In some embodiments, the intent detection engine 222 may be configured to perform one or more functions based on the respective application stages 224 activated by the computing environment, e.g., distributed computing environment 510 shown and described in connection with FIG. 4. In some embodiments, activating the one or more application stages 224 may cause the intent detection engine 222 to execute the one or more functions to fulfill the request for services of the user 202. In some embodiments, the intent detection engine 222 may perform the one or more functions to determine the intent prediction. Further, in some embodiments, the intent prediction may be based on the user behavior data and the result dataset.

In some embodiments, the networked system 300 may be a closed-loop system. In some embodiments, the intent detection engine 222 may receive the dataset corresponding to user behavior metadata from the distributed computing environment 510 and perform one or more functions at each of the application stages 224 of the intent detection engine 222. In some embodiments, the intent detection engine 222 may receive the set of second protocols from the distributed computing environment 510, including the dataset as an input, and execute the one or more application stages 224. In some embodiments, execution of the one or more application stage 224 may include a targeting of external users based on incomplete transactions and the telemetry and/or insight generation. In some embodiments, the result dataset from the intent detection engine 222 may further include data corresponding to positive values, negative values, or combinations thereof for completed and incomplete transactions based on retargeting of external users. Furthermore, according to some embodiments, the result dataset may further include the data based on retargeting of external users and the dataset received as input at the intent detection engine 222 in that most recent iteration of the activation of the intent detection engine 222.

In some embodiments, the intent detection engine 222 may include, but is not limited to, a consume function 230, an inference function 232, a compute function 234, a sink function 236, an action function 238, and a configuration function 240. In some embodiments, the intent detection engine 222 may further include other functions that may be dynamically configured at the intent detection engine 222 based on a requirement of the user 202 and/or the service provider 204. In some embodiments, the consume function 230 may include receiving the dataset, the dataset corresponding to user behavior data associated with the service provider 204 and/or the user 202. In some embodiments, the dataset may include receiving the plurality of accumulators. In some embodiments, the plurality of accumulators may include object instance data from user behavior metadata.

In some embodiments, the inference function 232 may include determining an external user intent based on data received from the consume function 230. In some embodiments, the inference function 232 may include applying the AI/ML model stage 224(4) and/or other logic to the dataset to determine the intent of the external user. In some embodiments, the compute function 234 may include computing a probability the external user intended to complete the transaction. In some embodiments, the sink function 236 may include storing, e.g., in a data store 242, any resulting data formed by the one or more functions. In some embodiments, the data store 242 may be associated with a server of the service provider. In some embodiments, the data store 242 may be an external data store.

In some embodiments, the action function 238 may include performing one or more actions based on the determination of the intent of the external user and/or the result data. In some embodiments, the action function 238 may include determining instructions corresponding to the actions to be taken by the distributed computing environment 510 and/or the driver node 512 based on the intent of the external user. In some embodiments, the configuration function 240 may include a plurality of settings associated with the intent detection engine 222 and/or the distributed computing environment 510. In some embodiments, the plurality of settings of the intent detection engine 222 and/or distributed computing environment 510 may be based on the logic of the user 202. In some embodiments, the configuration function 240 may be configured by an agent of the service provider. In some embodiments, the configuration function 240 may include storing the configurations for one or more users. In some embodiments, the configuration function 240 may receive the configurations from the computing device associated with the agent. In some embodiments, the agent may provide one or more inputs associated with the plurality of configuration settings at an interface 244 displayed on the computing device to be transmitted to the distributed computing environment 510 and/or the intent detection engine 222. In some embodiments, the intent detection engine 222 may be further configured to receive a protocol including the configurations from the agent of the service provider 204.

In some embodiments, the distributed computing environment 510 may be configured to enable the intent detection engine 222 to perform the one or more functions by transmitting the set of protocols to the intent detection engine 222. Consequently, in some embodiments, the intent detection engine 222 may receive the set of protocols and activate the respective one or more application stages 224 based on the set of protocols. In some embodiments, the distributed computing environment 510 may transmit the set of protocols to the intent detection engine 222 in batch mode. In some embodiments, the distributed computing environment 510 may transmit the set of protocols to the intent detection engine 222 in a micro-batch mode. Batch mode is a first period of time and micro-batch mode is for a second period of time less than the first period of time. Consequently, in some embodiments, the distributed computing environment 510 may be configured to run in batch mode for the first period of time and the distributed computing environment 510 may be further configured to run one or more micro-batch protocols within the first period of time. For example, batch mode may enable the distributed computing environment 510 to transmit the set of protocols once every two weeks, and micro-batch mode may enable the distributed computing environment 510 to transmit the set of protocols one or more times during the two-week period. In some embodiments, the intent detection engine 222 may perform the one or more functions in batch mode. In some embodiments, the distributed computing environment 510 and/or the intent detection engine 222 may be configured to continuously stream the one or more functions of the intent detection engine 222 to generate intent detection results based on metadata of the service provider 204.

Figure 4:
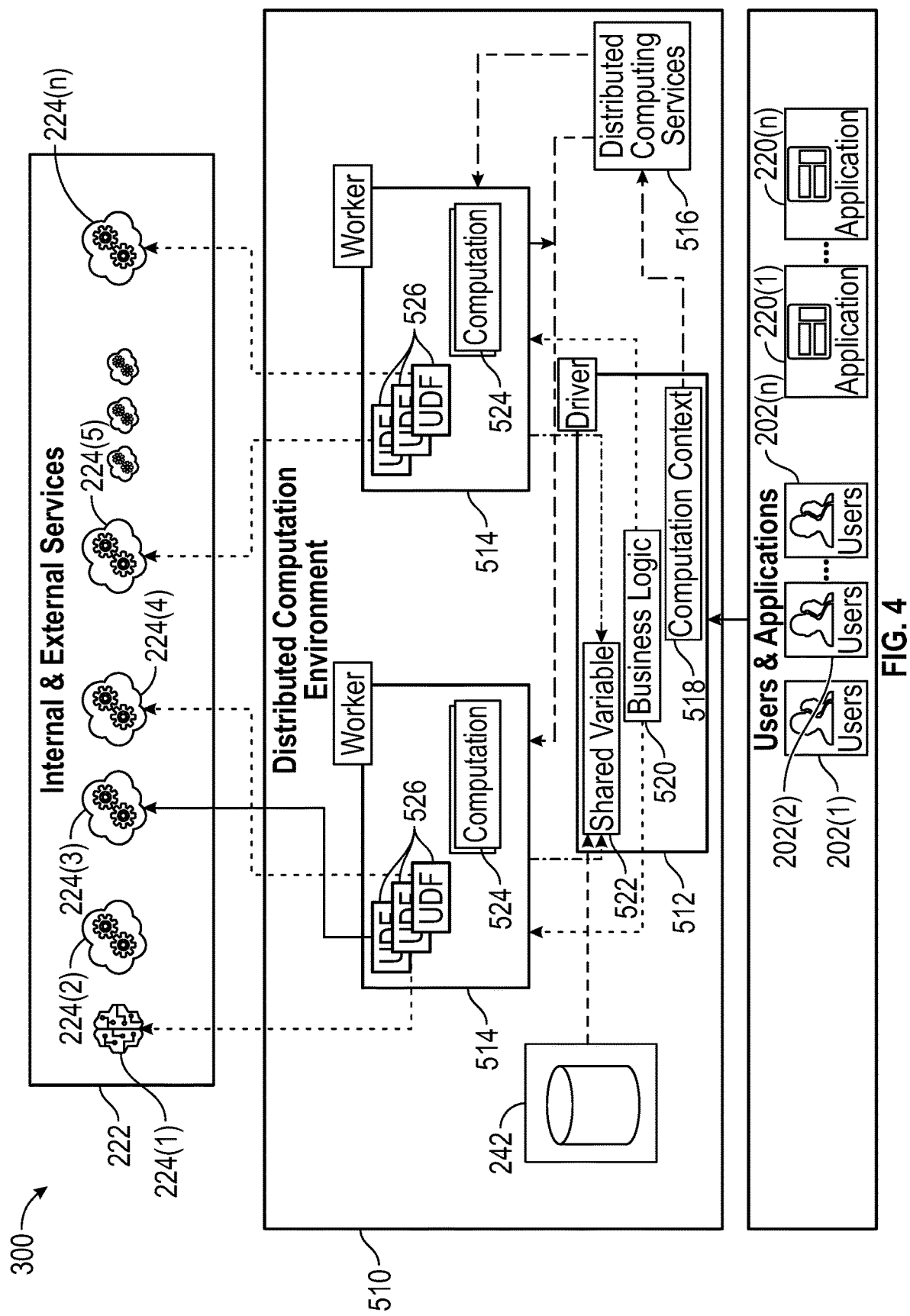
FIG. 4 is a block diagram depicting illustrative workflow orchestration of an exemplary networked system, consistent with example aspects of certain embodiments of the disclosed technology.

FIG. 4 is a block diagram depicting illustrative workflow orchestration of an exemplary networked system 300, consistent with example aspects of certain embodiments of the disclosed technology. According to one or more aspects of the disclosed technology, the overall networked system 300 may include a distributed computing environment 510 and an intent detection engine 222. In some embodiments, the intent detection engine 222 may be in communicable connection with the distributed computing environment 510. In some embodiments, the distributed computing environment 510 and the intent detection engine 222 may be in communication over a network. In some embodiments, the intent detection engine 222 and the distributed computing environment 510 may reside on the server of the service provider 204. In some embodiments, the distributed computing environment 510 and the intent detection engine 222 may reside on a cloud networking environment.

In some embodiments, the networked system 300 may further include one or more users 202, such as users 202(1) through 202(n). In some embodiments, the computing device of the user 202 may include one or more processors and a non-transitory computer readable media, the non-transitory computer readable media having stored thereon instructions for at least one application interface 220. In some embodiments, the non-transitory computer readable media may have stored thereon instructions that are executable by the one or more processors to cause the system to perform operations based on the instructions. In some embodiments, the application interface 220 may include a graphical user interface (GUI) that may be displayed by the application interface 220 and/or a display of the computing device.

In some embodiments, the networked system 300 may include one or more application interfaces 220, such as application interface 220(1) through 220(n), associated with each of the one or more users 202. In some embodiments, each user 202 may be associated with the respective application interface 220 through which the user 202 can provide the logic of the user 202 through the protocol to the distributed computing environment 510. In some embodiments, each user 202 and/or each application interface 220 may be in communicable connection with the distributed computing environment 510. In some embodiments, each user 202 and/or each application interface 220 may in communication with the distributed computing environment 510 over a network. In some embodiments, each such application interface 220 may be configured to receive inputs from the user and transmit a protocol to the distributed computing environment 510 based on the user inputs. In some embodiments, the user inputs may be based on a logic of each of the user. In some embodiments, the application interface 220 may include one or more pluggable modules selectable by the user 202. Each pluggable module may be a pluggable code segment of the protocol defined by the user. Furthermore, in some embodiments, the protocol may be defined by the user based on the logic of the user and the desired services from the distributed computing environment 510. In some embodiments, the application interface 220 may be configured to aggregate the pluggable modules to create the protocol to be transmitted to the distributed computing environment 510. In some embodiments, the one or more pluggable modules may be defined using the SQL configurations and definitions based on the logic of the user 202.

Referring to FIG. 4, in some embodiments, the distributed computing environment 510 may include a driver node 512, a worker node 514, and a distributed computing services node 516. The driver node 512, the worker node 514, and the distributed computing services node 516 may correspond to executable processes, procedures, and/or applications with associated hardware. In some embodiments, the driver node 512 may also be called a network controller. In some embodiments, the worker node 514 may also be called an executor. In other implementations, distributed computing environment 510 may include additional or different modules, or nodes, having specialized hardware and/or software as required.

In some embodiments, the driver node 512 may receive the protocol defining a request for services from the user 202 and/or the application interface 220 associated with the user 202. In some embodiments, the driver node 512 may receive the protocol defining the request for services from the computing device having the application interface 220. In some embodiments, the processes performed by the driver node 512 may be based, in part, on the protocol received from the application interface 220. In some embodiments, the protocol may include one or more pluggable modules using SQL configurations and definitions. In some embodiments, the driver node 512 may abstract a network layer of the distributed computing environment 510 based on the SQL configuration and definitions. In some embodiments, the network layer abstraction may enable the driver node 512 to configure and interface with one or more worker node 514 of the distributed computing environment 510. In some embodiments, the network layer abstraction may enable the driver node 512 to configure and interface with one or more one or more user-defined function modules 526 associated with each worker node 514 to fulfill the request for services of the protocol. In some embodiments, the abstraction of the network layer is not limited to the protocol from the application interface 220. In some embodiments, the abstraction of the interfaces with the components of the distributed computing environment 510 may vary based on the available nodes and modules of the distributed computing environment 510 and/or the available applications of the intent detection engine 222 or another server. In some embodiments, the protocol received from the application interface 220 may be an Application Program Interface (API). In some embodiments, the protocol received from the application interface 220 may further include an API.

In some embodiments, the driver node 512 may include a computation context module 518, a logic module 520, and a shared variable module 522. In some embodiments, the computation context module 518 may include one or more processors to execute the processes of the driver node 512 based on the protocol. In some embodiments, the computation context module 518 may be configured to obtain data corresponding to user behavior data from the data store 242 based on the protocol. In some embodiments, the data store 242 may include metadata corresponding to transaction data associated with the service provider. In some embodiments, the computation context module 518 may be configured to obtain data corresponding to user behavior data from the data store 242 as defined by the protocol and be further configured to generate one or more tables forming the dataset. In some embodiments, the dataset may include a plurality of accumulators, the plurality of accumulators corresponding to user behavior data defined by the protocol. In some embodiments, the user behavior data obtained by the computation module 524 may be associated with the one or more users 202. In some embodiments, the user behavior data may be associated with the user 202. In some embodiments, user behavior data may be associated with the service provider and including, but not limited to, data corresponding to completed transactions, incomplete transactions, check point data, external user information, past and current transaction data for external users, AI modeling datasets, other data and/or datasets, and combinations thereof. In some embodiments, the computation context module 518 may further include other data required by the distributed computing environment 510 and/or the driver node 512 to perform the one or more processes defined by the protocol and/or the request for services.

In some embodiments, the driver node 512 may include the logic module 520. In some embodiments, the logic module 520 may receive the protocol from the user 202 and/or the application interface 220 and determine the one or more processes to be performed by the driver node 512 based on the protocol. Consequently, in some embodiments, the actions taken by the driver node 512 may be based, in part, on the logic determined by the logic module 520 based on the protocol. In some embodiments, the logic module 520 may extract one or more features from the protocol. The one or more features may identify a respective application stage 224 of the intent detection engine 222 to fulfill the request for service. In some embodiments, the one or more features of the protocol may identify the respective application stage 224, i.e., application stage 224(1) through 242(n), to fulfill the request for service. In some embodiments, the one or more features 530 may include data corresponding to instructions defining the request for services. In some embodiments, the one or more features 530 may further include data corresponding to, but not limited to, user behavior data, application stages 224, one or more functions of the intent detection engine 222, reporting requirements, analytic settings, actions, messaging mockups, other data, and combinations thereof. In some embodiments, the one or more features may further include features 530 shown and described in connection with FIG. 7, as will be further discussed below.

In some embodiments, the logic module 520 may identify and abstract the workflow orchestration to the one or more worker node 514 based on the protocol. Consequently, in some embodiments, the driver node 512 may map the distributed computing environment 510 to the one or more worker nodes 514. In some embodiments, the driver node 512 may map the network layer to each of the worker node 514 based on the protocol and/or the respective application stage 224. In some embodiments, the worker node 514 may configure and/or abstract one or more user-defined function modules 526 at the worker node 514 based on the protocol. Furthermore, in some embodiments, the driver node 512 may dynamically map to the one or more worker nodes 514 and/or the one or more user-defined function modules 526 based on the protocol. In some embodiments, the logic module 520 may dynamically map to each of the worker node 514 and/or the one or more user-defined function modules 526 based on the protocol.

In some embodiments, the driver node 512 may include the shared variable module 522. In some embodiments, the shared variable module 522 may be in communication connection with the data store 242 and receive data from the data store 242. In some embodiments, the data may correspond to user behavior data associated with the user 202. In some embodiments, the data may include the dataset. In some embodiments, the shared variable module 522 may receive the dataset from the data store 242 and identify shared variables in the dataset. In some embodiments, the shared variables may include the plurality of accumulators. In some embodiments, the driver node 512 may provide the shared variables to the worker node 514 to execute the functions and computational complexities of the distributed computing environment 510. In some embodiments, the drive node 512 may further direct the dataset to be transmitted to the intent detection engine 222 for the one or more application stages 224. In some embodiments, the intent detection engine 222 may obtain the shared variables from the distributed computing environment 510 based on the one or more functions as defined by the set of protocols. In some embodiments, the worker node 514 may transmit the dataset including the plurality of accumulators to the intent detection engine 222 and/or the respective application stage 224. In some embodiments, the shared variable module 522 may obtain the dataset including the plurality of accumulators from the computation context module 518. In some embodiments, the plurality of accumulators may include metadata corresponding to user behavior data defined by the protocol. In some embodiments, the plurality of accumulators may include labeled and unlabeled object instances based on the user behavior data. In some embodiments, the user behavior data may include event data and/or checkpoint data.

In some embodiments, the worker node 514 may include a computation module 524 and one or more user-defined function modules 526. In some embodiments, the computation module 524 may be in communication with the driver node 512. In some embodiments, the computation module 524 may execute one or more actions based on instructions received from the driver node 512. In some embodiments, the computation module 524 may configure or abstract the one or more user-defined function modules 526 based on instructions received from the driver node 512. Consequently, in some embodiments, each worker node 514 may configure the one or more user-defined function modules 526 based, in part, on the protocol received from the user 202. In some embodiments, each user-defined function modules 526 may be in communicable connection with the intent detection engine 222 and/or the respective application stage 224.

In some embodiments, the worker node 514 may include the one or more user-defined function modules 526. In some embodiments, the worker node 514 may be configured to create or abstract each user-defined function module 526 based on instructions received from the driver node 512. In some embodiments, each worker node 514 may configure or abstract the one or more user-defined function modules 526 based on the protocol received from the user 202. Consequently, in some embodiments, each user-defined function module 526 may be based on the one or more features 530 of the protocol.

According to aspects of the disclosed technology, the user-defined function module 526 may be in communicable connection with the intent detection engine 222. In some embodiments, the user-defined function modules 526 may be in communication with the respective application stage 224. In some embodiments, the user-defined function modules 526 may generate and transmit the protocol to the intent detection engine 222. Consequently, in some embodiments, the worker node 514 may transmit the protocol to the respective application stage 224 of the intent detection engine 222. In some embodiments, the protocols may include, but are not limited to, data corresponding to instructions to the respective application stage 224 based on the protocol received from the user 202, the dataset, the plurality of accumulators, other data, and combinations thereof. In some embodiments, the protocol transmitted by the worker node 514 may be an API. In some embodiments, the protocol received from the worker node 514 may further include an API. Further, according to some implementations, the distributed computing environment 510 may include any of a plurality of other components and/or modules that may communicate with other devices and/or servers and may abstract a network layer based on a protocol received by the distributed computing environment 510.

In some embodiments, the distributed computing environment 510 may further include APIs that enable communication between the driver node 512 and the worker nodes 514. For example, the nodes, modules, and other components of the distributed computing environment 510 may reside on one or more computing machines and each of the nodes, modules, and other components may transmit information to the other using APIs. Consequently, in some embodiments, the distributed computing environment 510 may further include APIs that enable communication between the driver node 512, the worker nodes 514, and other processes of the distributed computing environment 510.

The distributed computing environment 510 may be maintained, in some embodiments, by an online service provider, which may provide identification of incomplete transactions in transaction datasets (i.e., metadata) processed by a financial or transaction processing entity (including distributed computing environment 510) using a machine learning or other AI model. In such regard, distributed computing environment 510 may include one or more processing applications which may be configured to interact with the model for incomplete transaction identification. In one example, distributed computing environment 510 may be provided by PayPal®, Inc. of San Jose, Calif, USA. However, in other implementations, distributed computing environment 510 may be maintained by or include another type of service provider.

In some embodiments, the networked system 300 may include the intent detection engine 222. In some embodiments, the intent detection engine 222 may include the plurality of application stage 224, such as application stage 224(1) through 242(n). Each application stage 224 may be configured to receive the protocol from the distributed computing environment 510 and perform a task or function based on the protocol. In some embodiments, the intent detection engine 222 may receive the protocol from the distributed computing environment 510 and activate the respective application stage 224.

In some embodiments, the networked system 300 may include application programming interfaces (APIs) that enable communication between the computing device associated with the user 202 and the distributed computing environment 510. In some embodiments, the networked system 300 may further include APIs that enable communication between the distributed computing environment 510 and the intent detection engine 222. In some embodiments, the networked system 300 may include APIs that enable communication between the distributed computing environment 510 and each of the plurality of application stages 224(1) through 224(n).

Figure 5:
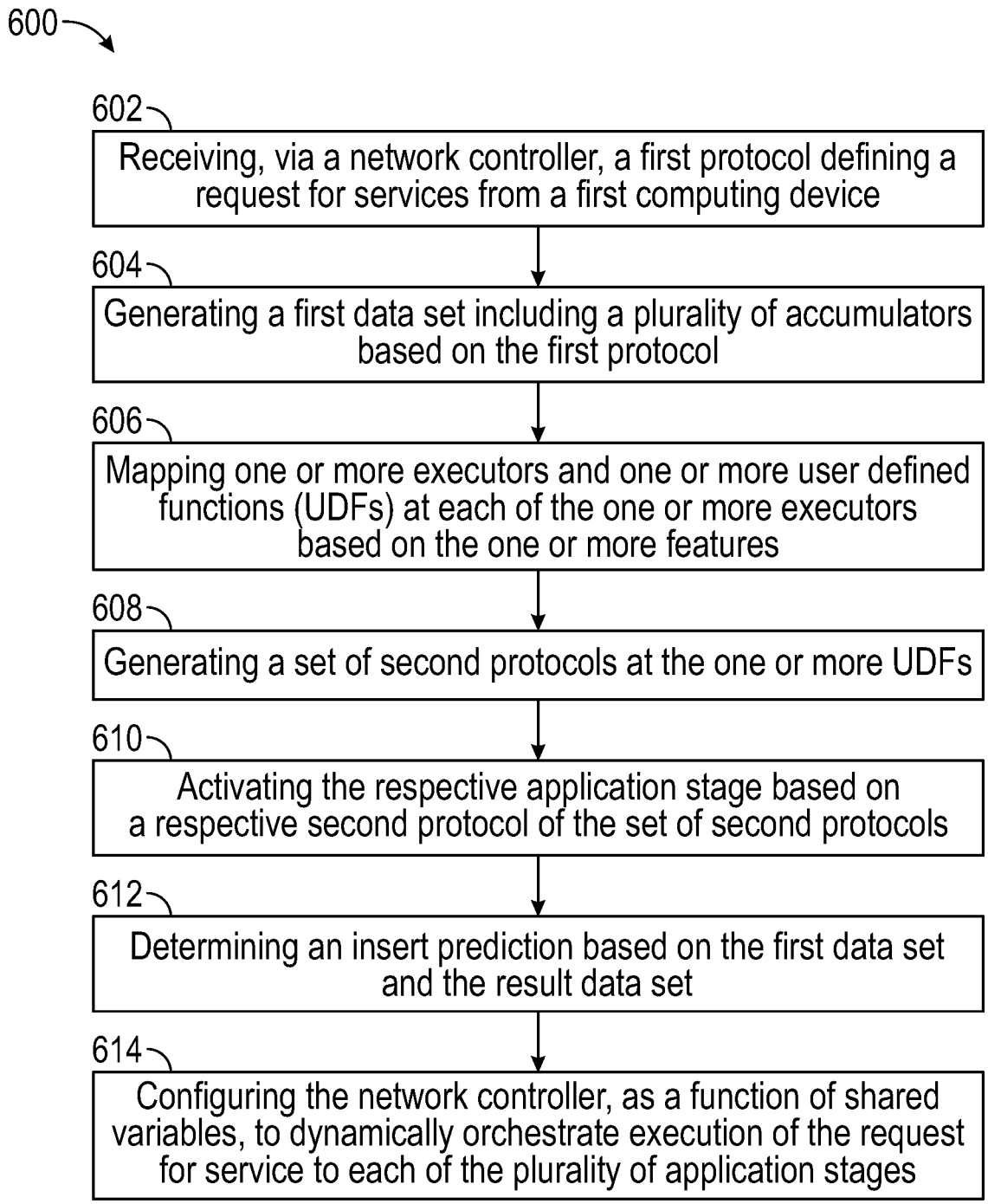
FIG. 5 is a flowchart depicting an exemplary method of workflow orchestration, consistent with example aspects of certain embodiments of the disclosed technology.

FIG. 5 is a flowchart depicting an example method of workflow orchestration, consistent with example aspects of certain embodiments of the disclosed technology. According to illustrative implementations herein, an example method 600 may include receiving a first protocol defining a request for services from a first computing device, at 602. In some embodiments, the first computing device may be associated with the user 202. Further, in some aspects, the user 202 may be a merchant.

The method 600 may include, at 604, generating a first dataset including a plurality of accumulators based on the first protocol. In some embodiments, the first dataset may be data corresponding to metadata including user behavior data defined by the first protocol. In some embodiments, the first protocol may include one or more features 530. In some embodiments, the distributed computing environment 510 may generate the first dataset based on the one or more features 530. In some embodiments, the first protocol may include SQL configurations and definitions and the first dataset may be generated based on the SQL configuration and definitions.

At 606, the method 600 may include mapping one or more executors and one or more user defined functions (UDFs) at each of the one or more executors based on the one or more features 530. In some embodiments, the one or more executors may be a worker node, such as worker node 514 of FIG. 5. In some embodiments, the one or more executors may include one or more UDF modules 526. In some embodiments, the network system may include a network controller that orchestrates the workflow in the network system. In some embodiments, the network controller may be a driver node, such as driver node 512 of FIG. 5.

The method 600 may also include, at 608, generating a set of second protocols at the one or more UDFs. In some embodiments, the network system may transmit the set of second protocols to the intent detection engine. In some embodiments, the one or more worker nodes 514 may transmit the set of second protocols to the intent detection engine. In some embodiments, the one or more user-defined function modules 526 may transmit the set of second protocols to the intent detection engine.

At 610, the method 600 may include activating the respective application stages based on a respective second protocol of the set of second protocols. In some embodiments, activating the respective application stages may further include receiving a result dataset from each respective application stage based on the first dataset and the respective second protocol. In some embodiments, activating the respective application stages may further include determining an intent prediction for each interaction based on the first dataset and the result dataset.

At 612, the method 600 may include determining an intent prediction based on the first dataset and a result dataset. In some embodiments, the result dataset may be received by the network system from the intent detection engine. In some embodiments, the result dataset may further include one or more datasets received from each respective application stages. In some embodiments, the result dataset may include information corresponding to an inference of external user intent, a computation of a probability of external user intent, data on an action or successful action yielding a completed transaction, experimentation results, other data, and the like.

At 614, the method 600 may include configuring the network controller, as a function of shared variables, to dynamically orchestrate execution of the request for service to each of the plurality of application stages. In some embodiments, the network controller may be configured to orchestrate execution of the workflow in the network system to each respective application stages based on the first protocol. In some embodiments, the network controller may orchestrate execution of the workflow based on the logic of the user.

Figure 6:
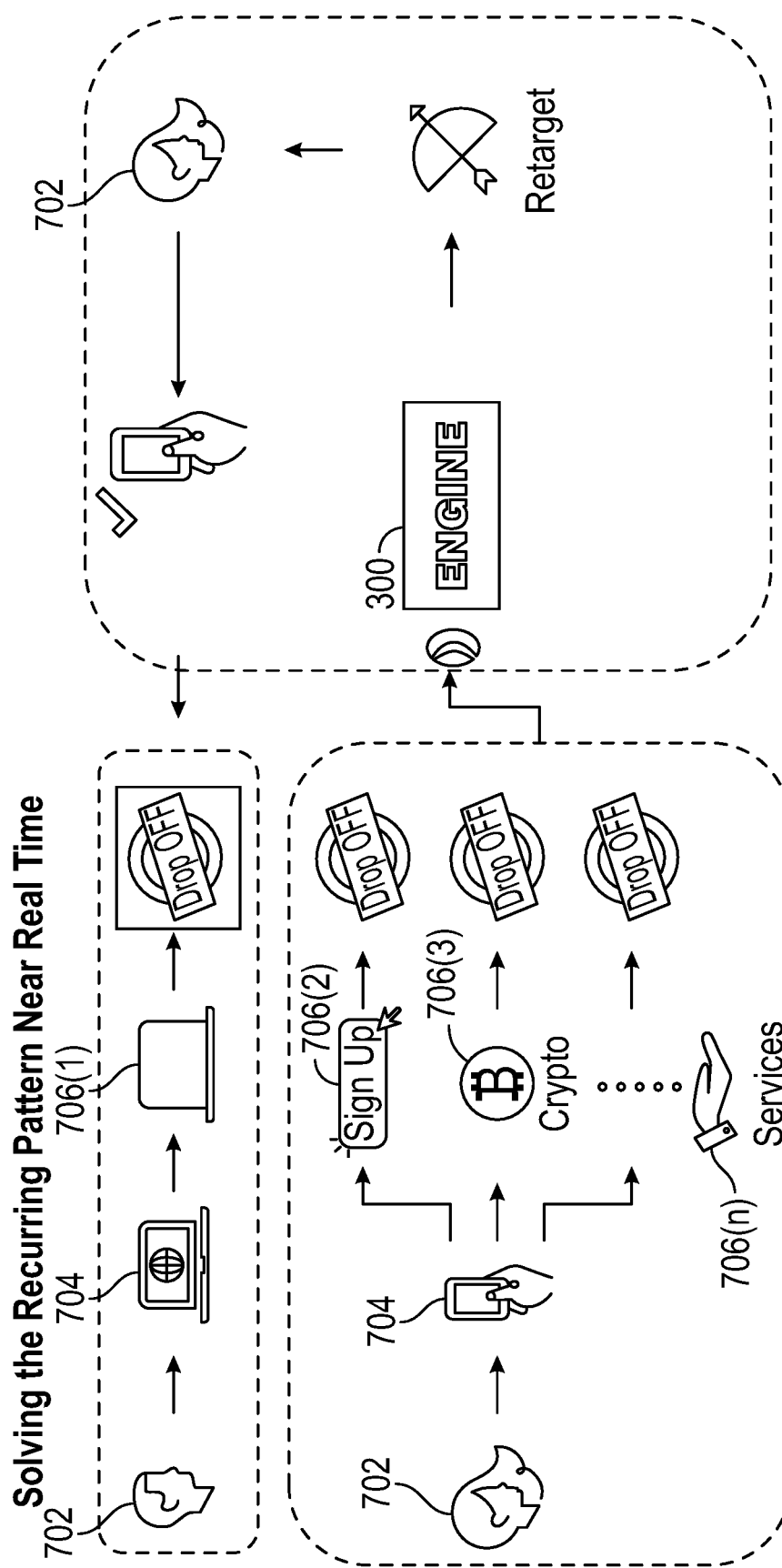
FIG. 6 is a flow diagram depicting example involvement of and workflow orchestration via the intent detection engine, consistent with example aspects of certain embodiments of the disclosed technology.

FIG. 6 is a flow diagram depicting example involvement of and workflow orchestration via the intent detection engine 500, consistent with example aspects of certain embodiments of the disclosed technology. In some embodiments, an external customer or user 702 may be conducting a transaction 706 with a merchant (e.g., user 202 of FIGS. 1-3) through an interface associated with the service provider prior to prematurely dropping off of the transaction 706, such as transaction 706(1) through 706(n). According to certain illustrative instances, for example, the external customer or user 702 may be subscribing to services of the service provider prior to prematurely dropping out of the transaction 706(2). In other instances, the external user may be conducting a transaction for cryptocurrency with the user 202 or the service provider prior to prematurely dropping off the transaction 706(3) before completion. In still other instances, the external user may be engaging in any of a plurality of electronic commercial activities with the user or the service provider prior to prematurely dropping off of the transaction 706(n) before completion. Consequently, in some embodiments, the network system 300 may be configured to identify these incomplete transactions and store data corresponding to the incomplete transactions as metadata. Upon execution of the protocol, such as in a batch request from the user or based on an intermittent request based on the logic, the intent detection engine 222 may receive a set of second protocols from the distributed computing environment 510 to activate one or more respective application stages 224 of the intent detection engine 222 to perform any of a plurality of services including, but not limited to, identify incomplete transactions associated with the user 202, inference an intent of the external user 702, compute a probability of the intent, target the external user 702 to complete the transaction, and/or generating any relevant reports or store any information corresponding to the services of the intent detection engine 222.

In one non-limiting example of an external user drop-off, the external user may be shopping on an electronic storefront of the user 202 and the external user may have one or more items added to the external user's shopping cart. Subsequently, the external user drops off without completing the transaction as the total cost of the items may exceed her budget. The intent detection engine 222 and/or the network system 300 may send the external user a notification about the items remaining in her shopping cart and the notification includes an offer for a 10% discount off of the total price for the transaction. Consequently, the external user may return to the company's electronic storefront to complete the transaction.

Figure 7:
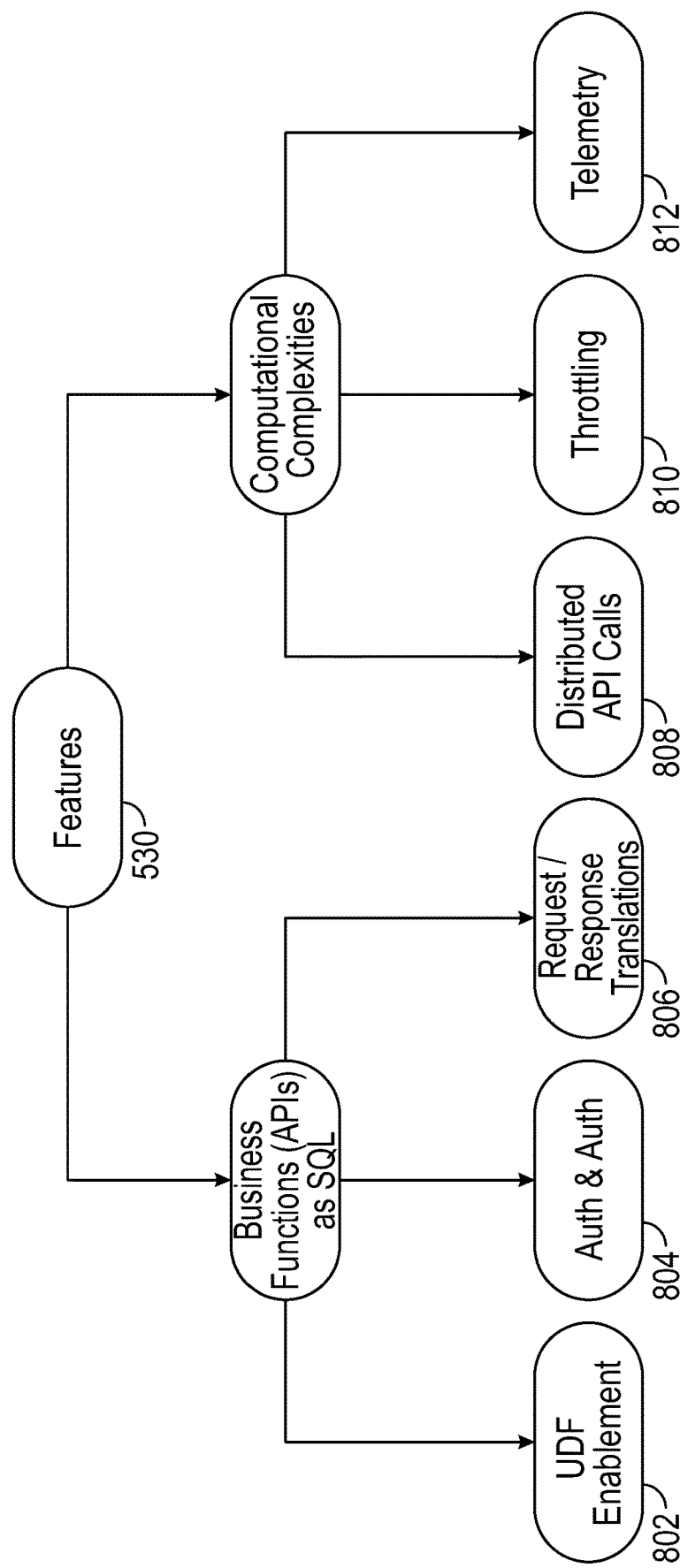
FIG. 7 is a diagram depicting illustrative aspects of workflow orchestration by the distributed computing environment based on the one or more features, consistent with example aspects of certain embodiments of the disclosed technology.

FIG. 7 is a diagram depicting illustrative aspects of workflow orchestration by the distributed computing environment 510 based on the one or more features 530, consistent with example aspects of certain embodiments of the disclosed technology. In some embodiments, a service provider server, e.g., as associated with distributed computing environment 510 of FIG. 5, may take a set of actions based on the one or more features defined by the protocol. In some embodiments, a driver node 512 may be configured/operated to take a set of actions based on the one or more features. In some embodiments, the actions of the driver node 512 may be based on the logic from the protocol. In some embodiments, the logic may include SQL configurations and definitions. In some embodiments, the one or more features may be associated with the SQL configurations and definitions. In some embodiments, the one or more features may include the features 530. In some embodiments, the features 530 may include functions and computational complexities based on the logic. In some embodiments, the functions may include APIs as SQL configurations. In some embodiments, the functions include a UDF enablement 802, an authenticate and authorize action 804, and a request/response translation 806. In some embodiments, the UDF enablement 802 may include, but is not limited to, allocating, assigning, establishing, generating, configuring, or any combinations thereof of the one or more UDF modules 526 based on the logic. In some embodiments, the driver node 512 may be configured to enable the one or more user defined functions 526 for each of the worker node 514. In some embodiments, the authenticate and authorize action 804 may include authenticating a user request and authorizing a service request by the distributed computing environment 510. In some embodiments, the driver node 512 may authorize the activation of the respective application stage 224 and authenticate the API calls to each of the respective application stages. In some embodiments, the request/response translation 806 may include receiving a request based on the protocol from the user and providing a response based on the result dataset received from the intent detection engine 222. In some embodiments, the driver node 512 may receive the request and provide the response based on the result dataset received from the intent detection engine 222.

In some embodiments, the one or more features 530 may include computational complexities determined by the distributed computing environment 510, the driver node 512, the distributed computing services node 516, or any combination thereof. In some embodiments, the computational complexities may include distributed API calls 808, throttling 810, and/or telemetry 812. In some embodiments, the driver node 512 may be configured to issue distributed API calls 808 to the worker node 514. Such API calls to the worker node 514 may include instructions corresponding to enabling the worker node 514, the one or more user-defined function modules 526, the application stage 224, other instructions, and combinations thereof. In some embodiments, throttling 810 may include the driver node 512 throttling requests for service based on a usage and/or an availability of network resources at the service provider server. In some embodiments, driver node 512 may throttle a service based on the network capacity or other similar reason. In some embodiments, telemetry 812 may include the driver node 512 configured to determine a telemetry of the user behavior data. In some embodiments, the telemetry 812 may include determining object instances in a dataset based on user behavior data, result data, other data, and combinations thereof.

Figure 8:
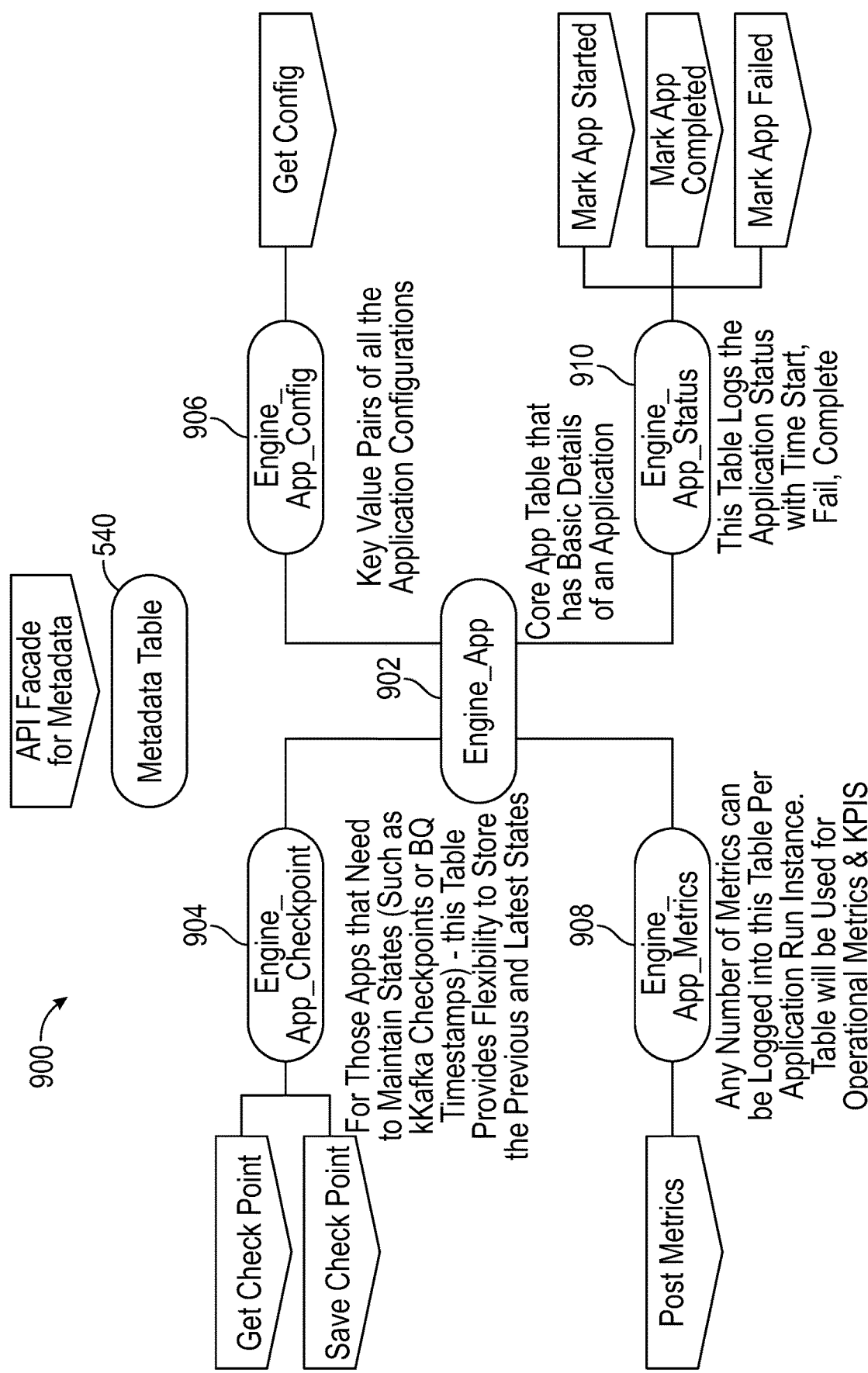
FIG. 8 is a diagram depicting an example protocol and metadata structure associated with obtaining data from the distributed computing environment, consistent with example aspects of certain embodiments of the disclosed technology.

FIG. 8 is a diagram depicting an example protocol and metadata structure associated with obtaining data from the distributed computing environment 510, consistent with example aspects of certain embodiments of the disclosed technology. In some embodiments, the application interface 220 may include one or more configurable modules to receive the one or more inputs from the user 202. Consequently, in some embodiments, the application interface 220 may transmit the protocol to the distributed computing environment 510. In some embodiments, the distributed computing environment 510 may receive the protocol from the application interface 220 and the distributed computing environment 510 may generate the dataset from the user behavior metadata using SQL configurations and definitions. In some embodiments, the intent detection engine 222 may be configured to communicate with the distributed computing environment 510 to access the dataset to perform the requested services. In some embodiments, the dataset may include a metadata table. In some embodiments, the metadata table may include the plurality of accumulators. The metadata table may include one or more sets of data stored in the SQL database and the data may be accessed by the distributed computing environment 510 and/or the intent detection engine 222 to perform the requested services. In some embodiments, the metadata table may include an application table 902, a checkpoint table 904, a configuration table 906, a metrics table 908, and an application status table 910. In some embodiments, the distributed computing environment 510 may be configured to generate the metadata table based on the protocol from the one or more users 202. In some embodiments, the driver node 512 may generate the metadata table based on the protocol. In some embodiments, the metadata table may be dynamically formed based on the logic of the one or more users 202.

In some embodiments, the metadata table may include an application table 902. In some embodiments, the application table 902 may include data corresponding to information related to each application stage 224 of the intent detection engine 222 that the distributed computing environment 510 is activating. In some embodiments, the checkpoint table 904, the configuration table 906, the metrics table 908, and the application status table 910 may be based, at least in part, on the application table 902. In some embodiments, the worker node 514 may interface the one or more user-defined function modules 526 based on the application table 902. In some embodiments, the worker node 514 may create the protocols defining the request for services to be transmitted to the intent detection engine 222 based on the application table 902.

In some embodiments, the metadata table may include a checkpoint table 904. In some embodiments, the checkpoint table 904 may allow the application stage 224 to maintain states, such as for Kafka checkpoints and/or timestamps (e.g., B Q timestamps, etc.). In some embodiments, the networked system 300 may be configured to create the checkpoint data and to save the checkpoint data at the checkpoint table 904.

In some embodiments, the metadata table may include a configuration table 906. In some embodiments, the configuration table 906 may include the value pairs of the application configurations for the application stage 224 of the intent detection engine 222. The value pairs may include a constant that defines the dataset and a value that belongs to data within the dataset. Consequently, in some embodiments, the intent detection engine 222 and/or the distributed computing environment 510 may be configured to obtain the data associated with the application configurations from the configuration table 906.

In some embodiments, the metadata table may include a metrics table 908. The metrics table 908 may include any of a plurality of metrics per application run instance from the intent detection engine 222. In some embodiments, the metrics table 908 may include data corresponding to operational metrics. In some embodiments, the metrics table 908 may include data corresponding to performance indicators. Performance indicators may include a quantifiable metric of performance over a period of time as defined by the user for an objective. In some embodiments, the distributed computing environment 510 and/or the intent detection engine 222 may post metrics from each run instance.

In some embodiments, the metadata table may include an application status table 910. The application status table 910 logs the application status. In some embodiments, the application status table 910 may include a start time of a process being performed by the application stage 224. In some embodiments, the application status table 910 may include a failure time of a process being performed by the application stage 224. In some embodiments, the application status table 910 may include a time to complete the process by the application stage 224. In some embodiments, the intent detection engine 222 may be configured to update the application status table 910 with data corresponding to the time the application stage 224 is started, the time the application stage 224 is completed, and/or the time the application stage 224 is failed.

Figure 9:
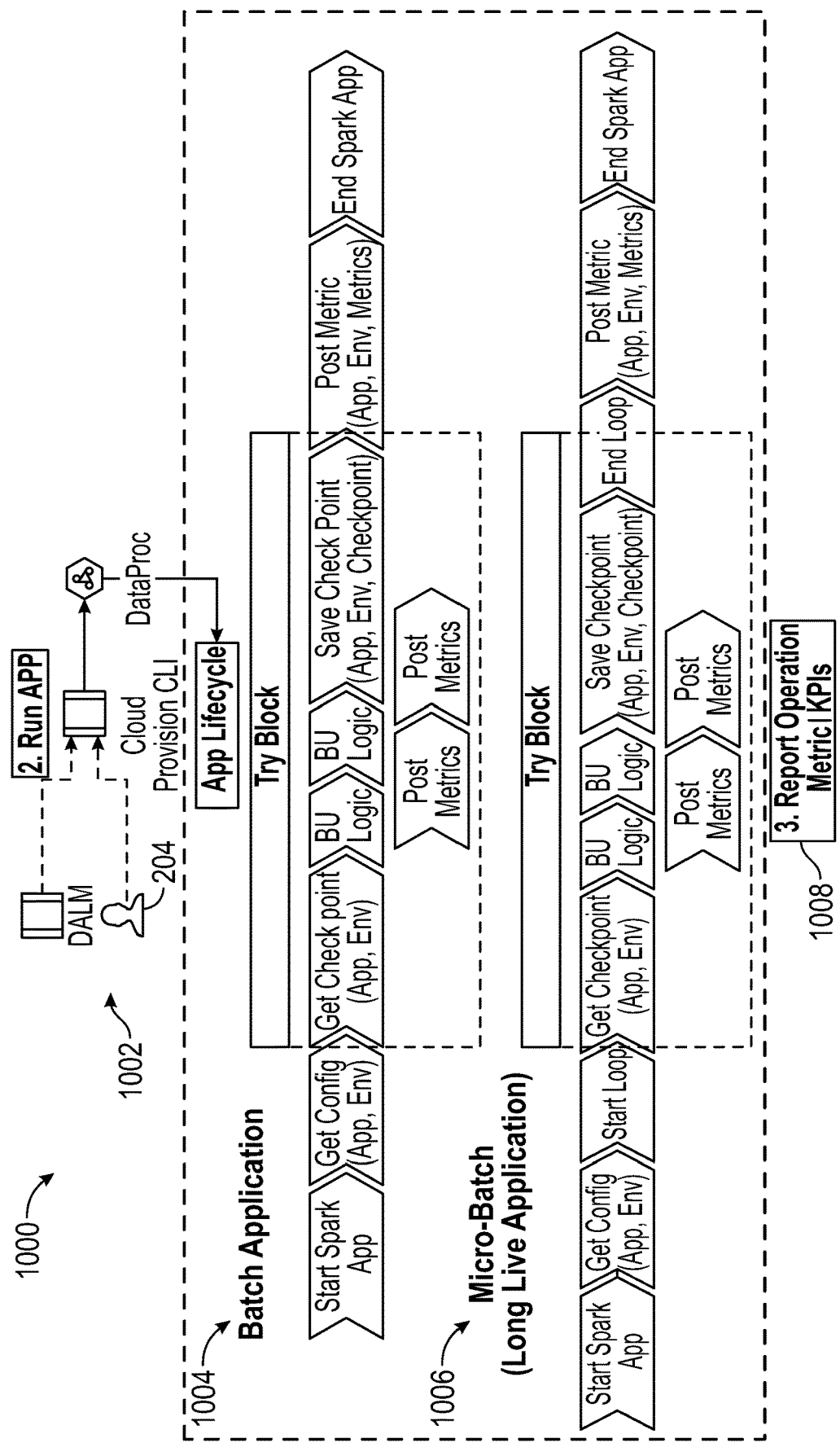
FIG. 9 is a flow diagram illustrating features associated with an application life cycle, consistent with example aspects of certain embodiments of the disclosed technology.

FIG. 9 is a flow diagram illustrating features associated with an application life cycle 1000, consistent with example aspects of certain embodiments of the disclosed technology. In some embodiments, the application life cycle 1000 may include running the application 1002 by an engineer or based on the logic of the user. In some embodiments, running the application 1002 may further include running a batch application 1004 and/or a micro-batch application 1006. The batch application 1004 may be run to process a large quantity of metadata. The micro-batch application 1006 may include running smaller quantities of metadata than the batch application 1004. In some embodiments, the batch application 1004 may include the starting the run instance of the application stage 224 of the intent detection engine 222, obtaining the data corresponding to the application configurations from the configuration table 906, obtaining data corresponding to the checkpoints from the checkpoint table 904, posting data corresponding to metrics associated with the run instance based on the logic at the metrics table 908, saving data corresponding to checkpoint to the checkpoint table 904, posting any additional metrics to the metrics table 908, and ending the application run instance. In some embodiments, the processes of obtaining the checkpoints, posting the metrics based on the logic, and saving the checkpoints may be enclosed within a try block. The try block encloses processes that may generate an exception and will prevent the rest of the block from executing if the exception is generated.

In some embodiments, the micro-batch application 1006 may include the starting the run instance of the application stage 224 of the intent detection engine 222, obtaining the data corresponding to the application configurations from the configuration table 906, starting a loop of the micro-batch application 1006, obtaining data corresponding to the checkpoints from the checkpoint table 904, posting data corresponding to metrics associated with the run instance based on the logic at the metrics table 908, saving data corresponding to checkpoint to the checkpoint table 904, ending the loop of the micro-batch application 1006, posting any additional metrics to the metrics table 908, and ending the application run instance. In some embodiments, the processes of obtaining the checkpoints, posting the metrics based on the logic, and saving the checkpoints may be enclosed within a try block. The try block encloses processes that may generate an exception and will prevent the rest of the block from executing if the exception is generated. In some embodiments, the application life cycle 1000 may further include reporting operational metrics and/or performance indicators to an agent of the service provider.

Figure 10:
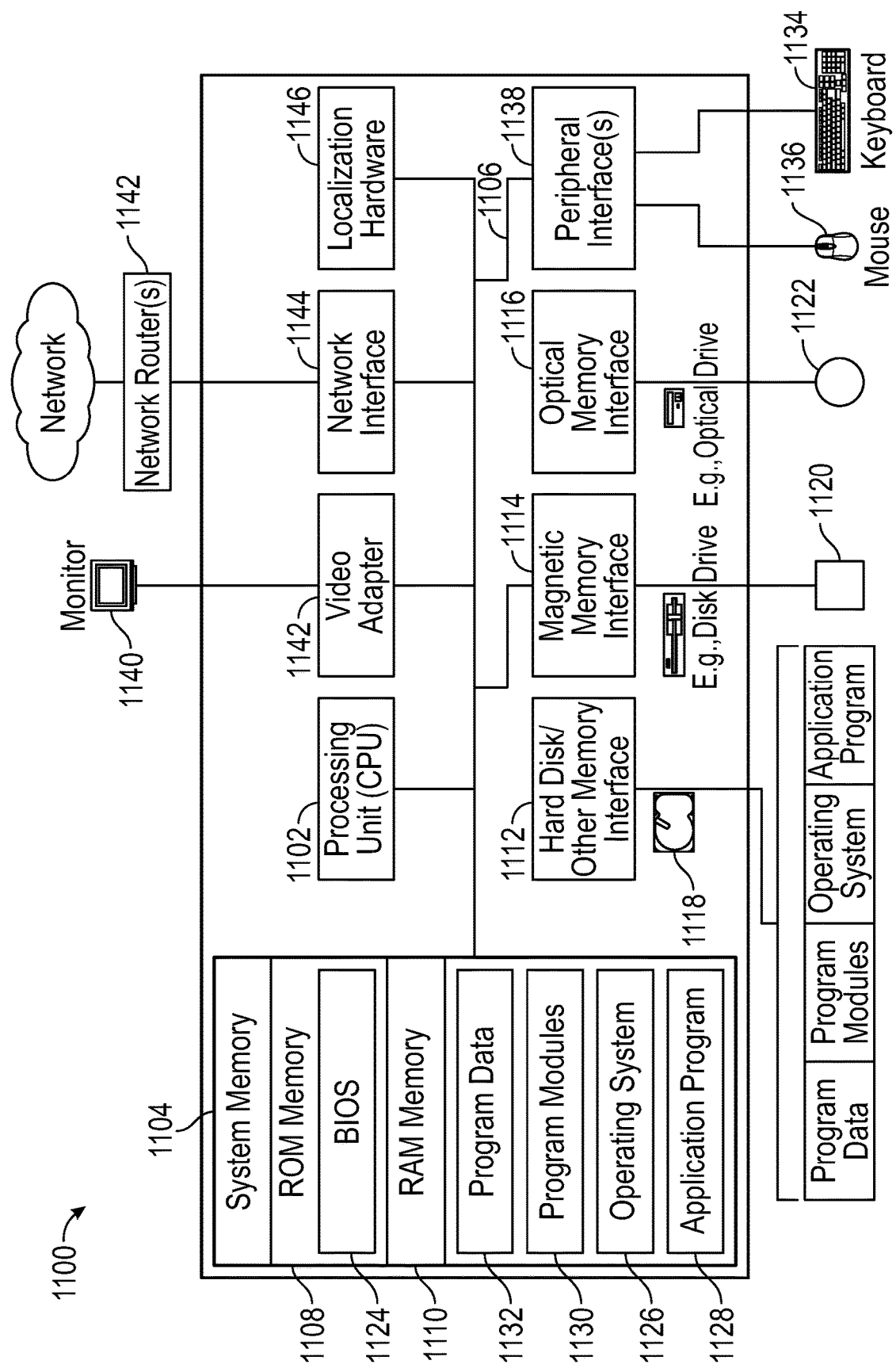
FIG. 10 is a block diagram of an illustrative computing system, consistent with example aspects of certain embodiments of the disclosed technology.

FIG. 10 is a block diagram of an example computing system, such as a desktop computer, laptop, smartphone, tablet, or any other such device having the ability to execute instructions, such as those stored within a non-transitory, computer-readable medium. Furthermore, while described and illustrated in the context of a single computing system 1100, those skilled in the art will also appreciate that the various tasks described hereinafter may be practiced in a distributed environment having multiple computing systems 1100 linked via a local or wide-area network in which the executable instructions may be associated with and/or executed by one or more of multiple computing systems 1100.

In its most basic configuration, computing system environment 1100 typically includes at least one processing unit 1102 and at least one memory 1104, which may be linked via a bus 1106. Depending on the exact configuration and type of computing system environment, memory 1104 may be volatile (such as RAM 1110), non-volatile (such as ROM 1108, flash memory, etc.) or some combination of the two. Computing system environment 1100 may have additional features and/or functionality. For example, computing system environment 1100 may also include additional storage (removable and/or non-removable) including, but not limited to, magnetic or optical memory, hard drives, other solid state memory, tape drives, flash drives and the like. Such additional memory devices may be made accessible to the computing system environment 1100 by means of, for example, a hard disk/other memory interface 1112, a magnetic memory interface 1114, and/or an optical memory interface 1116. As will be understood, these devices, which would be linked to the system bus 1106, respectively, allow for reading from and writing to, e.g., a hard disk 1118, reading from or writing to, e.g., a removable magnetic disk drive 1120, and/or for reading from or writing to, e.g., an optical disk 1122, such as a CD/DVD ROM, or other optical media. The drive interfaces and their associated computer-readable media allow for the nonvolatile storage of computer readable instructions, data structures, program modules and other data for the computing system environment 1100. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 1100.

A number of program modules may be stored in one or more of the memory/media devices. For example, a basic input/output system (BIOS) 1124, containing the basic routines that help to transfer information between elements within the computing system environment 1100, such as during start-up, may be stored in ROM 1108. Similarly, RAM 1110, hard drive 1118, and/or peripheral memory devices may be used to store computer executable instructions comprising an operating system 1126, one or more applications programs 1128, other program modules 1130, and/or program data 1132. Still further, computer-executable instructions may be downloaded to the computing environment 1100 as needed, for example, via a network connection. The applications programs 1128 may include, for example, a browser, including a particular browser application and version, which browser application and version may be relevant to workstations where a user may perform processing associated with, e.g., intent detection, as described herein. Similarly, the operating system 1126 and its version may be relevant to workstations where a user may perform processing associated with, e.g., intent detection, as described herein.

An end-user may enter commands and information into the computing system environment 1100 through input devices such as a keyboard 1134 and/or a pointing device 1136. While not illustrated, other input devices may include a microphone, a joystick, a game pad, a scanner, etc. These and other input devices would typically be connected to the processing unit 1102 by means of a peripheral interface 1138 which, in turn, would be coupled to bus 1106. Input devices may be directly or indirectly connected to processor 1102 via interfaces such as, for example, a parallel port, game port, firewire, or a universal serial bus (USB). To view information from the computing system environment 1100, a monitor 1140 or other type of display device may also be connected to bus 1106 via an interface, such as via video adapter 1142. In addition to the monitor 1140, the computing system environment 1100 may also include other peripheral output devices, not shown, such as speakers and printers.

The computing system environment 1100 may also utilize logical connections to one or more computing system environments. Communications between the computing system environment 1100 and the remote computing system environment may be exchanged via a further processing device, such a network router 1142, that is responsible for network routing. Communications with the network router 1142 may be performed via a network interface component 1144. Thus, within such a networked environment, e.g., the Internet, World Wide Web, LAN, or other like type of wired or wireless network, it will be appreciated that program modules depicted relative to the computing system environment 1100, or portions thereof, may be stored in the memory storage device(s) of the computing system environment 1100.

The computing system environment 1100 may also include localization hardware 1146 for determining a location of the computing system environment 1100. In embodiments, the localization hardware 1146 may include, for example only, a GPS antenna, an RFID chip or reader, a WiFi antenna, or other computing hardware that may be used to capture or transmit signals that may be used to determine the location of the computing system environment 1100. Data from the localization hardware 1146 may be included in a callback request or other user computing device metadata in the methods of this disclosure.

Further, in some embodiments, the disclosed technology may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows: (i) define neural network architecture/model, (ii) transfer the input data to the exemplary neural network model, (iii) train the exemplary model incrementally, (iv) determine the accuracy for a specific number of timesteps, (v) apply the exemplary trained model to process the newly-received input data, (vi) optionally and in parallel, continue to train the exemplary trained model at specified intervals and/or with a specified periodicity.

In some embodiments and, optionally, in combination of any embodiment described herein, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described herein, the exemplary aggregation function may be a mathematical function that combines (e.g., sum, product, etc.) input signals to the node. In some embodiments and, optionally, in combination of any embodiment described herein, an output of the exemplary aggregation function may be used as input to the exemplary activation function. In some embodiments and, optionally, in combination of any embodiment described herein, the bias may be a constant value or function that may be used by the aggregation function and/or the activation function to make the node more or less likely to be activated. Consistent with embodiments herein, the above AI and machine learning aspects may be, e.g., utilized at the artificial intelligence (AI)/ machine learning (ML) model stage 224(4), applied to the event data and/or event-stitching data in determining an intent of the external user, involved with the processing of transaction datasets (e.g., metadata), such as by financial or transaction processing entities, and the like.

Various detailed embodiments of the present disclosure, taken in conjunction with the accompanying figures, are disclosed herein. However, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As used herein, the term "campaign objective" refers to intended output or outcome associated with at least one logic stage or engine implemented, at least in part, based on an enterprise strategy associated with a business, user, or other entity. A service provider may also further define, execute, implement, initiate, or any combination thereof, the one or more logic stages to achieve the campaign objective. For example, the enterprise strategy may be based on marketing objectives associated with the user. More specifically, the enterprise strategy may be based on intent detection and retargeting of incomplete transactions between the user and the user's customers.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present disclosure.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

Other implementations of the disclosure will be apparent to those skilled in the art from consideration of the specification and practice of the innovations disclosed herein. It is intended that the specification and examples be considered as examples only, with a true scope and spirit of the disclosure being indicated by the present disclosure and claims and various associated principles of related patent doctrine.

The invention claimed is:

1. A system comprising:
   one or more processors; and
   a non-transitory computer readable medium having stored thereon instructions that are executable by the one or more processors to cause the system to perform operations comprising:
   receiving, via a network controller, a first protocol defining a request for services from a first computing device,
   extracting, by the network controller, one or more features from the first protocol identifying a respective application stage of a plurality of application stages to fulfill the request for service, generating a first dataset including a plurality of accumulators based on the first protocol, the plurality of accumulators comprising shared variables based on user behavior data including event data and/or checkpoint data between users, mapping one or more executors and one or more user defined functions (UDFs) at each of the one or more executors based on the one or more features, generate a set of second protocols at the one or more UDFs, generate an application program interface (API) including the set of second protocols at each of the one or more UDFs, activate the respective application stage based on a respective second protocol of the set of second protocols, and determine an intent prediction based on the first dataset and a result dataset;

wherein the network controller is configured to dynamically orchestrate execution of the request for service by generating the one or more executors and the one or more UDFs for each respective application stage in near real time.

2. The system of claim 1, wherein the first protocol comprise one or more pluggable modules defined using structured query language (SQL) configurations and definitions based on the plurality of application stages, wherein each of the one or more executors and the one or more UDFs are dynamically mapped by the network controller based on the first protocol.

3. The system of claim 2, wherein a first user of the first computing device defines each of the one or more dynamically pluggable modules, wherein the first protocol is based, in part, on a logic defined by a first user.

4. The system of claim 1, wherein receiving the first protocol further comprises:

receiving one or more application programming interfaces (APIs) including the first protocol.

5. They system of claim 1, wherein each of the plurality of accumulators comprises shared variables accessible by the respective application stages.

6. The system of claim 1, wherein each of the plurality of accumulators comprises labeled and unlabeled object instances based on metadata.

7. The system of claim 6, wherein the metadata comprises user behavior data, wherein the user behavior data includes event data and/or checkpoint data between users.

8. The system of claim 1, wherein the plurality of application stages comprises pluggable stages of an intent detection engine for retargeting one or more second users based on the first dataset and the second dataset;

wherein the respective application stages of the intent detection engine are configured to be added and/or removed from the intent detection engine based on a network configuration requirement, wherein the network controller dynamically maps the executors and the UDFs based on an available application stage of the intent detection engine.

9. The system of claim 1, wherein activating the respective application stage further comprises:

receive a result dataset from each respective application stage based on the first dataset and the respective second protocol, and determine an intent prediction for each interaction based on the first dataset and the result dataset.

10. The system of claim 1, wherein the plurality of application stages comprises an intent detection, analytics, computation, experimentation, prediction, and action stage.

11. The system of claim 1, wherein the result dataset comprises data corresponding to each respective application stage fulfilling the request for service, wherein the intent prediction is associated with an interaction between the first user and each of the plurality of second users and further comprises a telemetry and/or insight generation.

12. The system of claim 1, further comprising:

wherein each respective application stage receives the respective set of second protocols and executes an action based on the respective set of second protocols and the first dataset.

13. A computer implemented method comprising:

receiving at a network controller a first protocol defining a request for services from a first computing device;

generating a first dataset including a plurality of accumulators based on the first protocol, the plurality of accumulators comprising shared variables based on user behavior data including event data and/or checkpoint data between users;

mapping one or more executors and one or more user defined functions (UDFs) at each of the one or more executors based on one or more features of the first protocol, generating a set of second protocols at the one or more UDFs;

activating a respective application stage based on a respective second protocol of the set of second protocols; and determining a telemetry and/or insight generation based on the first dataset;

wherein the network controller is configured to dynamically orchestrate execution of the request for service to each of the plurality of application stages.

14. The method of claim 13, wherein activating the respective application stage includes:

receiving a result dataset from each respective application stage based on the first dataset and the respective second protocol, and determining an intent prediction for each interaction based on the first dataset and the result dataset.

15. The method of claim 13, wherein the first protocol comprise one or more pluggable modules defined using structured query language (SQL) configurations and definitions based on available application stages, wherein each of the one or more executors and the one or more UDFs are dynamically mapped by the network controller based on the first protocol.

16. The method of claim 13, wherein each respective application stage receives the respective set of second protocols and executes an action based on the respective set of second protocols and the first dataset.

17. The method of claim 13, wherein the network controller fulfills the request for service in near real time (NRT).

18. A computer program product embodied on one or more non-transitory computer readable media having stored thereon instructions that are executable by one or more processors to cause the computer program product to perform operations comprising:

receive at a network controller an application programming interface (API) including a first protocol defining a request for services from a first computing device, the first protocol including one or more pluggable modules defined using SQL configurations and definitions based on available application stages and a logic of a first user;

extract one or more features from the first protocol identifying a respective application stage of a plurality of application stages to fulfill the request for service;

generate a first dataset including a plurality of accumulators based on the first protocol, the plurality of accumulators comprising shared variables based on user behavior data including event data and/or checkpoint data between users;

map one or more executors and one or more user defined functions (UDFs) at each of the one or more executors based on the one or more features;

generate one or more application program interfaces (APIs) at each of the one or more UDFs, each of the one or more APIs including a respective second protocol of a set of second protocols;

activate the respective application stage based on a respective second protocol of the set of second protocols, wherein activating the respective application stage includes:
  receive a result dataset from each respective application stage based on the first dataset and the respective second protocol, and
  determine an intent prediction for each interaction based on the first dataset and the result dataset,
  wherein each respective application stage receives the respective set of second protocols and executes an action based on the respective set of second protocols and the first dataset; and determine a telemetry and/or insight generation based on the first dataset and the result dataset;

wherein the network controller is configured to dynamically orchestrate execution of the request for service to each of the plurality of application stages in near real time.

19. The computer program product of claim 18, wherein the plurality of application stages comprises pluggable stages of an intent detection engine for retargeting one or more second users based on the first dataset and the second dataset;
  wherein application stages of the intent detection engine are configured to be added and/or removed from the intent detection engine by a service provider,
wherein the network controller maps the executors and the UDFs based on an available application stage of the intent detection engine.

20. The computer program product of claim 18, wherein the plurality of application stages comprises an intent detection, analytics, computation, experimentation, prediction, and action stage.

* * * * *